(12) United States Patent
Gawlick et al.

(10) Patent No.: US 10,740,310 B2
(45) Date of Patent: Aug. 11, 2020

(54) INTELLIGENT PREPROCESSING OF MULTI-DIMENSIONAL TIME-SERIES DATA

(71) Applicant: Oracle International Corporation, Redwood Shores, CA (US)

(72) Inventors: Dieter Gawlick, Palo Alto, CA (US); Kenny C. Gross, Escondido, CA (US); Zhen Hua Liu, San Mateo, CA (US); Adel Ghoneimy, Hillsborough, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 15/925,427

(22) Filed: Mar. 19, 2018

(65) Prior Publication Data
US 2019/0286725 A1 Sep. 19, 2019

(51) Int. Cl.
*G06F 17/00* (2019.01)
*G06F 16/22* (2019.01)
(Continued)

(52) U.S. Cl.
CPC ...... *G06F 16/2264* (2019.01); *G06F 11/3072* (2013.01); *G06F 16/1744* (2019.01);
(Continued)

(58) Field of Classification Search
CPC .. G06F 16/2264; G06F 17/40; G06F 11/3072; G06F 16/1744; G06F 16/2365;
(Continued)

(56) References Cited

U.S. PATENT DOCUMENTS

| 7,076,389 B1 | 7/2006 | Gross et al. |
|---|---|---|
| 7,248,980 B1 | 7/2007 | Gross et al. |

(Continued)

OTHER PUBLICATIONS

Dutta et al., "Improving Situational Awareness for Precursory Data Classification using Attribute Rough Set Reduction Approach". 2013. (Year: 2013).*

(Continued)

*Primary Examiner* — Syed H Hasan
(74) *Attorney, Agent, or Firm* — Park, Vaughan, Fleming & Dowler LLP (57) ABSTRACT

The disclosed embodiments relate to a system that preprocesses sensor data to facilitate prognostic-surveillance operations. During operation, the system obtains training data from sensors in a monitored system during operation of the monitored system, wherein the training data comprises time-series data sampled from signals produced by the sensors. The system also obtains functional requirements for the prognostic-surveillance operations. Next, the system performs the prognostic-surveillance operations on the training data and determines whether the prognostic-surveillance operations meet the functional requirements when tested on non-training data. If the prognostic-surveillance operations do not meet the functional requirements, the system iteratively applies one or more preprocessing operations to the training data in order of increasing computational cost until the functional requirements are met.

18 Claims, 6 Drawing Sheets

(51) Int. Cl.
*G06N 5/04* (2006.01)
*G06N 20/00* (2019.01)
*G06F 16/174* (2019.01)
*G06F 16/23* (2019.01)
*G06F 17/40* (2006.01)
*G06F 11/30* (2006.01)
*G06F 11/00* (2006.01)

(52) U.S. Cl.
CPC .......... *G06F 16/2365* (2019.01); *G06F 17/40* (2013.01); *G06N 5/047* (2013.01); *G06N 20/00* (2019.01); *G06F 11/004* (2013.01); *G06F 11/3006* (2013.01)

(58) Field of Classification Search
CPC ... G06F 11/3006; G06F 11/004; G06N 5/047; G06N 20/00
See application file for complete search history.

(56) References Cited

U.S. PATENT DOCUMENTS

| | | | |
|---|---|---|---|
| 7,281,112 B1 | 10/2007 | Gross et al. | |
| 7,292,659 B1 | 11/2007 | Gross et al. | |
| 7,292,952 B1 | 11/2007 | Gross et al. | |
| 7,478,075 B2 | 1/2009 | Urmanov et al. | |
| 7,702,485 B2 | 4/2010 | Gross et al. | |
| 8,311,774 B2* | 11/2012 | Hines | G06F 11/30 702/182 |
| 9,190,844 B2* | 11/2015 | Tran | H02J 3/14 |
| 9,514,213 B2 | 12/2016 | Wood et al. | |
| 9,843,596 B1* | 12/2017 | Averbuch | H04L 63/1416 |
| 10,148,680 B1* | 12/2018 | Segev | H04L 63/145 |
| 2003/0093187 A1* | 5/2003 | Walker | B64C 13/20 701/1 |
| 2004/0002776 A1* | 1/2004 | Bickford | G05B 23/0275 700/30 |
| 2006/0085367 A1* | 4/2006 | Genovese | G06Q 10/00 706/44 |
| 2017/0270172 A1 | 9/2017 | Tobin et al. | |
| 2017/0308917 A1 | 10/2017 | Winters et al. | |
| 2018/0060151 A1 | 3/2018 | Gross et al. | |
| 2019/0286725 A1* | 9/2019 | Gawlick | G06F 11/3072 |

OTHER PUBLICATIONS

Naderpour et al., "Supporting situation awareness using neural network and expert system". 2012. (Year: 2012).*

Gross et al., "A Supervisory Control Loop with Prognostics for Human-in-the-Loop Decision Support and Control Applications", 2017 IEEE COGSIMA, Mar. 27, 2017, pp. 1-7.

Kholghi et al., "An Analytical Framework for Data Stream Mining Techniques Based on Challenges and Requirements", retrieved from the internet: URL:https://pdfs.semanticscholar.org/bec5/08524cb4af360f0a4261fbc4cf0bd26a9195.pdf (retrieved on May 7, 2019).

International Search Report and Written Opinion from PCT Patent Application No. PCT/US2019/014513 dated May 16, 2019 by the European Patent Office.

* cited by examiner

INTELLIGENT PREPROCESSING OF MULTI-DIMENSIONAL TIME-SERIES DATA

BACKGROUND

Field

The disclosed embodiments generally relate to database systems for storing multidimensional time-series telemetry data. More specifically, the disclosed embodiments relate to a database system, which performs intelligent preprocessing operations on multi-dimensional time-series data to facilitate subsequent prognostic-surveillance operations to proactively detect impending problems in monitored assets.

Related Art

Enormous numbers of sensors are presently being deployed to monitor critical assets across different industries. For example, a medium-sized data center can include over 1,000,000 sensors monitoring thousands of business-critical servers, a modern passenger jet can include 75,000 sensors, and an oil refinery can include over 1,000,000 sensors. These sensors generate large volumes of time-series data, which can be analyzed using prognostic-surveillance techniques based on machine-learning (ML) to detect the onset of degradation mechanisms before problems arise. This makes it possible to perform "proactive maintenance" to address impending problems before they cause failures in critical assets. Note that proactive maintenance techniques are superior to conventional "reactive maintenance techniques," which typically generate an alarm after a degradation event is significantly underway, or after a critical asset fails.

However, time-series sensor data often has problems. For example, the time-series data is often gathered from low-resolution sensors that produce low-resolution data values, which can adversely affect prognostic-surveillance. Also, because the time-series data is typically communicated through shared and possibly unreliable communication channels, data values can be missing. Also, individual sensors can fail, drift out of calibration, or develop intermittent "stuck at" faults, and the time bases that are used to gather the sensor data can be (variably) misaligned. These and other sensor-disturbance problems can significantly reduce the effectiveness of follow-on prognostic-surveillance operations.

Hence, what is needed is a technique for preprocessing time-series sensor data to mitigate the above-described problems.

SUMMARY

The disclosed embodiments relate to a system that preprocesses sensor data to facilitate prognostic-surveillance operations. During operation, the system obtains training data from sensors in a monitored system during operation of the monitored system, wherein the training data comprises time-series data sampled from signals produced by the sensors. The system also obtains functional requirements for the prognostic-surveillance operations. Next, the system performs the prognostic-surveillance operations on the training data and determines whether the prognostic-surveillance operations meet the functional requirements. If the prognostic-surveillance operations do not meet the functional requirements when tested on non-training data, the system iteratively applies one or more preprocessing operations to the training data in order of increasing computational cost until the functional requirements are met.

In some embodiments, the one or more preprocessing operations include one or more of the following: a faulty sensor detection operation, which detects faulty sensors and replaces or removes data produced by the faulty sensors; a data dequantization operation, which dequantizes low-resolution time-series data to produce higher-resolution time-series data; a missing data imputation operation, which replaces missing data values in the time-series data with imputed data values determined based on correlations between the signals; an analytic-resampling operation that resynchronizes data measurements, which are out of phase because of clock-synchronization disparities in measurement instrumentation for different signals; a tri-point clustering operation that identifies clusters of highly-correlated signals within clusters, which are poorly correlated between clusters; an optimal memory vectorization operation, which represents a structure of the time-series data using a minimal set of vectors; a statistical compression operation, which uses a circular file compression technique to compress older data values; and a remaining-useful life (RUL) estimation operation, which estimates a remaining useful life for one or more components in the monitored system.

In some embodiments, the functional requirements for the prognostic-surveillance operations include one or more of the following: a false-alarm probability (FAP); a missed-alarm probability (MAP); and a time-to-detection (TTD) metric for discovering anomalies.

In some embodiments, iteratively applying the one or more preprocessing operations to the training data includes repeating the following operations as necessary: applying a lowest-computational-cost preprocessing operation to the training data, which has not yet been applied to the training data; performing the prognostic-surveillance operations on the training data; determining whether the prognostic-surveillance operations meet the functional requirements; and if the prognostic-surveillance operations do not meet the functional requirements, repeating the operations.

In some embodiments, the system additionally trains an inferential model for a prognostic pattern-recognition system using the training data, and preprocesses subsequently received time-series data from the sensors using the same preprocessing operations as were applied to the training data. The system then applies the prognostic pattern-recognition system, which uses the inferential model in a surveillance mode, to the subsequently received time-series data to detect incipient anomalies that arise during subsequent execution of the monitored system.

In some embodiments, the training data and the subsequently received time-series data are stored in a time-series database system. In these embodiments, the preprocessing operations and the prognostic pattern-recognition operations are performed by functionality, which is incorporated into the time-series database system.

In some embodiments, the inferential model is trained using a nonlinear, nonparametric (NLNP) regression technique.

In some embodiments, the NLNP regression technique comprises a Multivariate State Estimation Technique (MSET).

In some embodiments, the functionality that performs the preprocessing operations and the prognostic pattern-recognition operations is incorporated into the time-series database system through one or more of: a declarative query; a data-integrity constraint-enforcement mechanism; and an MSET model, which is incorporated into a data provenance-tracking mechanism within the time-series database system. Note that mechanisms for incorporating functionality into a database system through declarative queries and through the database system's constraint-enforcement mechanisms are well-known. Moreover, an MSET-based tamper-proof provenance-tracking mechanism is disclosed in U.S. patent application Ser. No. 15/850,027, entitled "MSET-Based Process for Certifying Provenance of Time-Series Data in a Time-Series Database," by inventors Kenny C. Gross, et al., filed on 21 Dec. 2017, which is hereby incorporated by reference.

In some embodiments, applying the prognostic pattern-recognition system to detect incipient anomalies comprises detecting impending failures in the monitored system.

In some embodiments, the system certifies provenance for any received time-series data before processing the received time-series data.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Within this detailed description, the terms "cloud computing services" and "cloud services" refer to systems that provide computing as a service by sharing resources and software to computing devices over a network such as the Internet, typically as a paid (e.g., metered or subscription) service. For example, cloud services provide storage resources, computational power, software, and data access to their customers, who are generally unaware of the underlying structure of the physical devices and software that facilitate the services. Examples of cloud computing service vendors include Amazon Corporation of Seattle, Wash. (offering Amazon Web Services); Rackspace Corporation of San Antonio, Tex.; and Microsoft Corporation of Redmond, Wash. (offering Windows Azure).

Overview

The disclosed embodiments relate to a new cloud-based service, called "intelligent data processing" (IDP). IDP provides a generic framework for preprocessing big data time series databases to: facilitate subsequent prognostic-surveillance operations; improve and compact data for follow-on processing; and bring the most relevant data to the awareness of system users. Note that Internet-of-Things (IoT) systems have to ingest massive amounts of multi-dimensional time-series data and must detect abnormal conditions in real-time. An important additional requirement is the isolation of sensor errors from asset errors. Both tasks require: the lowest possible rate of false positives and negatives; full provenance for the sensor data; "cleaning" of the sensor data to provide improved quality; realignment of the data to correct for clock mismatch issues in data-sampling, archival, and transmission instrumentation; and compaction of the sensor data for size reduction and processing efficiency. In doing so, the IDP-based system will provide users with timely notification of abnormal conditions, while providing fast access to specific items of data, which are required for rapid and accurate root-cause analysis. In addition to facilitating fast and high-quality decision making, the IDP service also improves support for subsequent investigations, application evolution, and research involving the data.

Prognostic-Surveillance System

Figure 1A:
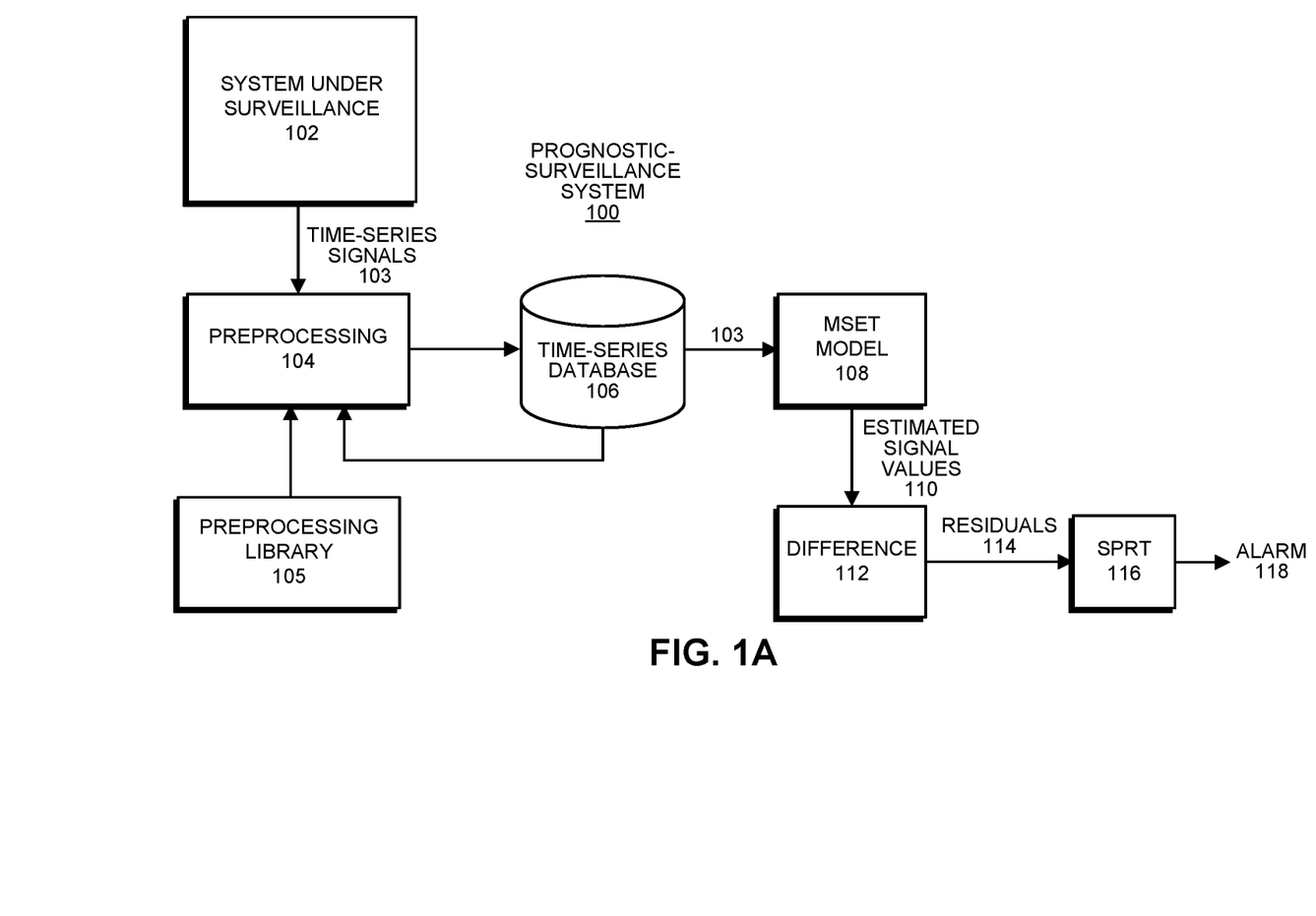
FIG. 1A illustrates an exemplary prognostic-surveillance system in accordance with the disclosed embodiments.

FIG. 1A illustrates an exemplary prognostic-surveillance system 100 in accordance with the disclosed embodiments. As illustrated in FIG. 1, prognostic-surveillance system 100 operates on a set of time-series signals 103 obtained from sensors in a system under surveillance 102. System under surveillance 102 can generally include any type of machinery or facility, which includes sensors and generates time-series signals. Moreover, time-series signals 103 can originate from any type of sensor, which can be located in a component in system under surveillance 102, including: a voltage sensor; a current sensor; a pressure sensor; a rotational speed sensor; and a vibration sensor.

During operation of prognostic-surveillance system 102, time-series signals 103 can feed through a preprocessing module 104 into a time-series database 106, which stores the time-series signals 103 for subsequent analysis. Preprocessing module 104 performs various preprocessing operations, such as dequantizing data values and resampling data values, using code modules obtained from preprocessing library 105. Note that these preprocessing operations can improve the effectiveness of subsequent prognostic-surveillance operations involving the time-series data 103.

Next, the time-series signals 103 feed from time-series database 106 into MSET pattern-recognition model 108. (For a description of MSET, see U.S. Pat. No. 7,181,651, entitled "Detecting and Correcting a Failure Sequence in a Computer System Before a Failure Occurs," by inventors Kenny C. Gross, et al., filed on 11 Feb. 2004, which is hereby incorporated by reference.) Although it is advantageous to use MSET for pattern-recognition purposes, the disclosed embodiments can generally use any one of a generic class of pattern-recognition techniques called "non-linear, nonparametric (NLNP) regression," which includes neural networks, support vector machines (SVMs), auto-associative kernel regression (AAKR), and even simple linear regression (LR).

Next, MSET model 108 is "trained" to learn patterns of correlation among all of the time-series signals 103. This training process comprises a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1A. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so the problems can be avoided or proactively fixed.

Figure 1B:
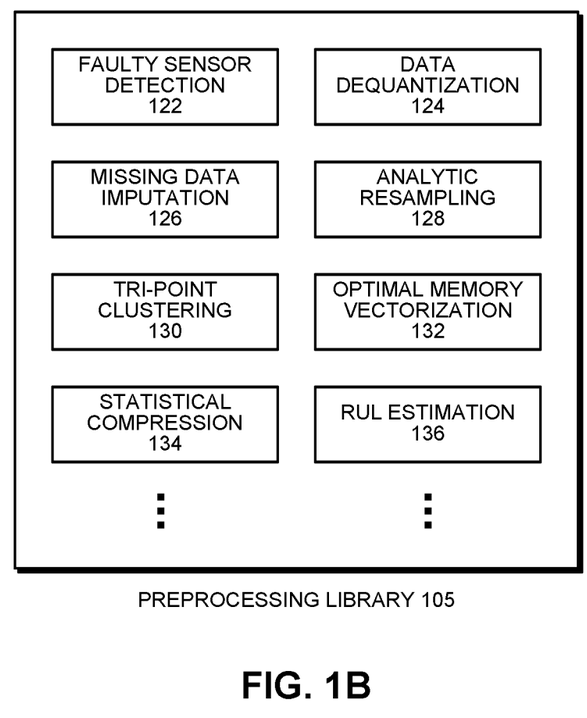
FIG. 1B illustrates a library of preprocessing modules in accordance with the disclosed embodiments.

FIG. 1B illustrates an exemplary preprocessing library 105 containing various preprocessing modules in accordance with the disclosed embodiments. These modules include a faulty sensor detection module 122, which detects faulty sensors and replaces or removes data produced by the faulty sensors. (See U.S. Pat. No. 7,076,389, entitled "Method and Apparatus for Validating Sensor Operability in a Computer System," by inventors Kenny C. Gross, et al., filed on 26 Jul. 2004, which is hereby incorporated by reference.) They also include a data dequantization module 124, which dequantizes low-resolution time-series data to produce higher-resolution time-series data. (See U.S. Pat. No. 7,248,980, entitled "Method and Apparatus for Removing Quantization Effects in a Quantized Signal," by inventors Kenny C. Gross, et al., filed on 27 Jan. 2006, which is hereby incorporated by reference.) They also include a missing data imputation module 126, which replaces missing data values in the time-series data with imputed data values determined based on correlations between the signals. (See U.S. Pat. No. 7,292,952, entitled "Replacing a Signal from a Failed Sensor with an Estimated Signal Derived from Correlations with Other Signals," by inventors Kenny C. Gross, et al., filed on 3 Feb. 2004, which is hereby incorporated by reference.) They also include an analytic-resampling (ARP) module 128 that resynchronizes data measurements, which are out of phase because of clock-synchronization disparities in measurement instrumentation for different signals. (See U.S. Pat. No. 7,292,659, entitled "Correlating and Aligning Monitored Signals for Computer System Performance Parameters," by inventors Kenny C. Gross, et al., filed on 26 Sep. 2003, which is hereby incorporated by reference.) They also include a tri-point clustering module 130 that identifies clusters of highly-correlated signals within clusters, which are poorly correlated between clusters. (See U.S. Pat. No. 9,514,213, entitled "Per-Attribute Data Clustering Using Tri-Point Data Arbitration," by inventors Alan Paul Wood, et al., filed on 15 Mar. 2013, which is hereby incorporated by reference.) They also include an optimal memory vectorization module 132, which represents a structure of the time-series data using a minimal set of vectors. (See U.S. Pat. No. 7,478,075, entitled "Reducing the Size of a Training Set for Classification," by inventors Kenny C. Gross, et al., filed on 11 Apr. 2006, which is hereby incorporated by reference.) They also include a statistical compression module 134, which uses a circular file compression technique to compress older data values. (See U.S. Pat. No. 7,281,112, entitled "Method for Storing Long-Term Performance Data in a Computer System with Finite Storage Space," by inventors Kenny C. Gross, et al., filed on 29 Feb. 2005, which is hereby incorporated by reference.) They also include a remaining-useful life (RUL) estimation module 136, which estimates a remaining useful life for one or more components in the monitored system. (See U.S. Pat. No. 7,702,485, entitled "Method and Apparatus for Predicting Remaining Useful Like for a Computer System," by inventors Kenny C. Gross, et al., filed on 12 Jun. 2008, which is hereby incorporated by reference.)

SA Decision Loop

The disclosed embodiments provides a system that facilitates situation awareness (SA), for human-in-the-loop supervisory control. This system enables human supervisors to practice proactive "condition based maintenance" for complex assets using information passively gleaned from large-scale time series databases. SA has recently become a topic of intense interest in business-critical and safety-critical industries. Trained human experts often make mistakes when two or more events are occurring at once, or real alarms are buried in streams of false alarms, or in situations where no alarms are triggered due to noisy signals and humans supervisors cannot discern new degradation trends. For example, in 2017, there were three major US Navy ship collisions involving ships that had very sophisticated technology onboard. These collisions were attributed to SA failures by humans in the control rooms, and resulted in hundreds of millions of dollars in damages and lost lives. An SA failure was also the reason that a US destroyer shot down a passenger jet killing 300 civilians during the first Gulf War. SA issues, which cause human operators to take inappropriate actions, are also frequently the cause downtime in business critical facilities.

Figure 2:
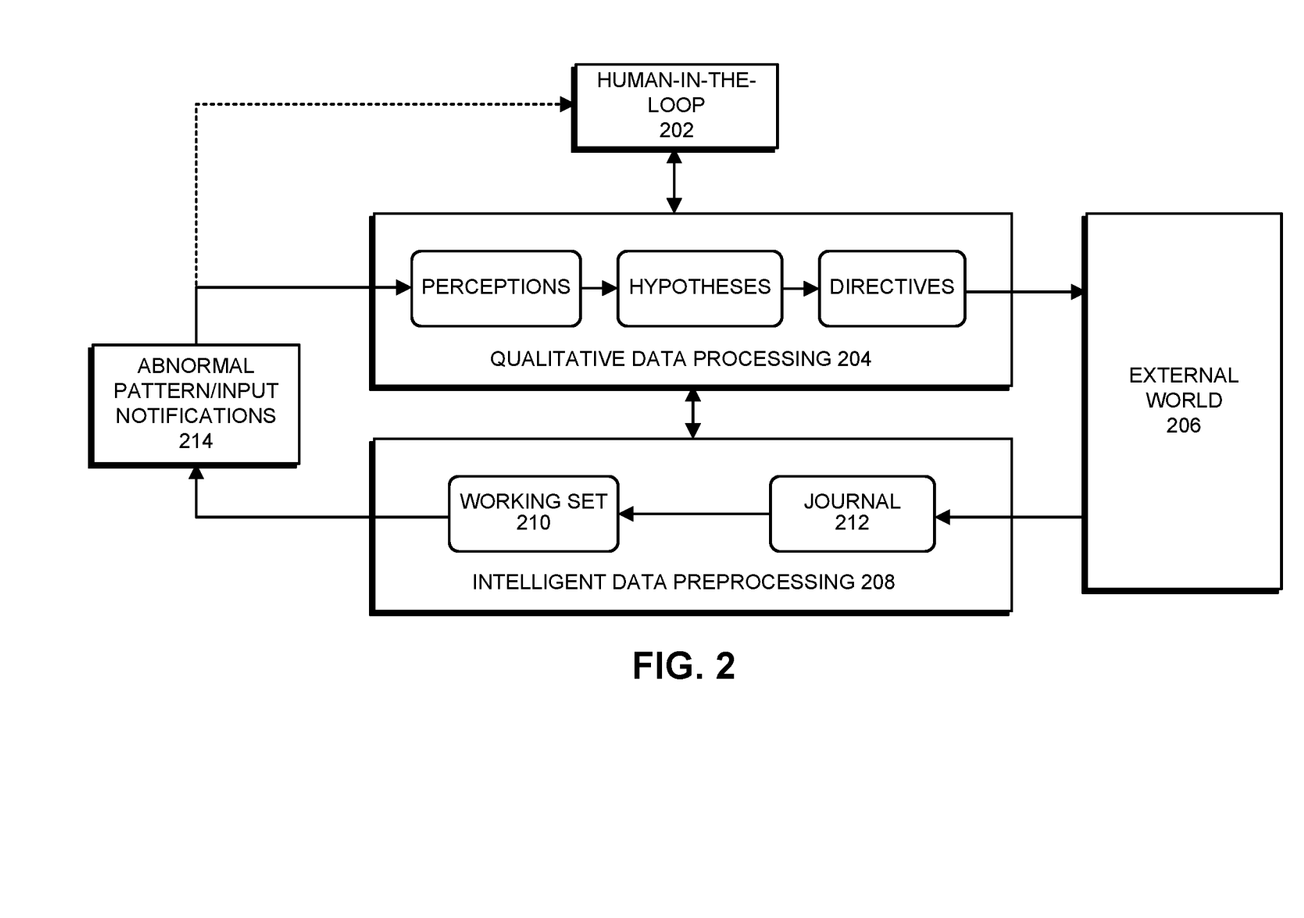
FIG. 2 illustrates an exemplary situational awareness (SA) decision loop in accordance with the disclosed embodiments.

The disclosed embodiments facilitate enhanced SA by providing a system that stores time-series data in a journal and an associated working set, and also integrates automated prognostic discovery with conventional DB Query functionally. For example, FIG. 2 illustrates an exemplary situational awareness (SA) decision loop that makes use of such a system in accordance with the disclosed embodiments. During operation, various data from the external world 206 feeds into intelligent data preprocessing (IDP) system 208, which comprises a journal 212 and a working set 210 that are both described in more detail below. During operation, IDP 208 detects abnormal patterns or inputs and generates corresponding notifications 214. These notifications 214 are communicated to a qualitative data processing (QDP) unit 204, which formats the data for analysis by a human-in-the-loop 202. This enables the human-in-the-loop 202 to form perceptions, develop hypotheses and generate directives, which are used to trigger actions in external world 206.

IDP Dataflow

In some embodiments, the above-described prognostic-surveillance system 100 is incorporated into an IDP system, which integrates advanced MSET pattern recognition with a suite of preprocessing techniques and DB Query functionality. This IDP system facilitates automated prognostic anomaly discovery, which is robust with respect to: sensor disturbances; signal asynchronies from clock-mismatch issues; low-resolution sensors in the customer's assets; and missing values in the ingested data streams. At the same time, the IDP system provides tamper-proof provenance certification for the original raw time-series. Note that databases have so far managed data by focusing on the structure of the data and ignoring the data content. With IDP, databases are able to notify users about abnormal conditions indicated by the data content in real-time without any programming effort.

Note that big data is essentially unmanageable. It is close to intractable for human experts to know what is important and when; there is simply too much data. However, MSET is able to process multi-dimensional time-series data to identify abnormal situations in real time. Once such an anomalous situation is identified, three important questions need to be answered: (1) classification—what anomalous patterns are emerging; (2) assessment—what is the most likely root cause; and (3) decision—what should be done about the situation, wherein possible answers range from: "continue monitoring," to "schedule remedial maintenance," to "immediately terminate operation."

By comparing the current situation with similar situations identified in the past and stored in a journal, IDP can facilitate calling-up the closest matches. In essence, IDP provides an automated way of: identifying anomalies that a human expert may not have known to query for; characterizing the anomaly (including exact signals triggering anomaly alerts, which is important for root-cause analysis); and pulling up related cases (from a journal library of past similar anomalous events). This makes it possible to share descriptions of anomalous behavior experience across a large group of experts.

Figure 3:
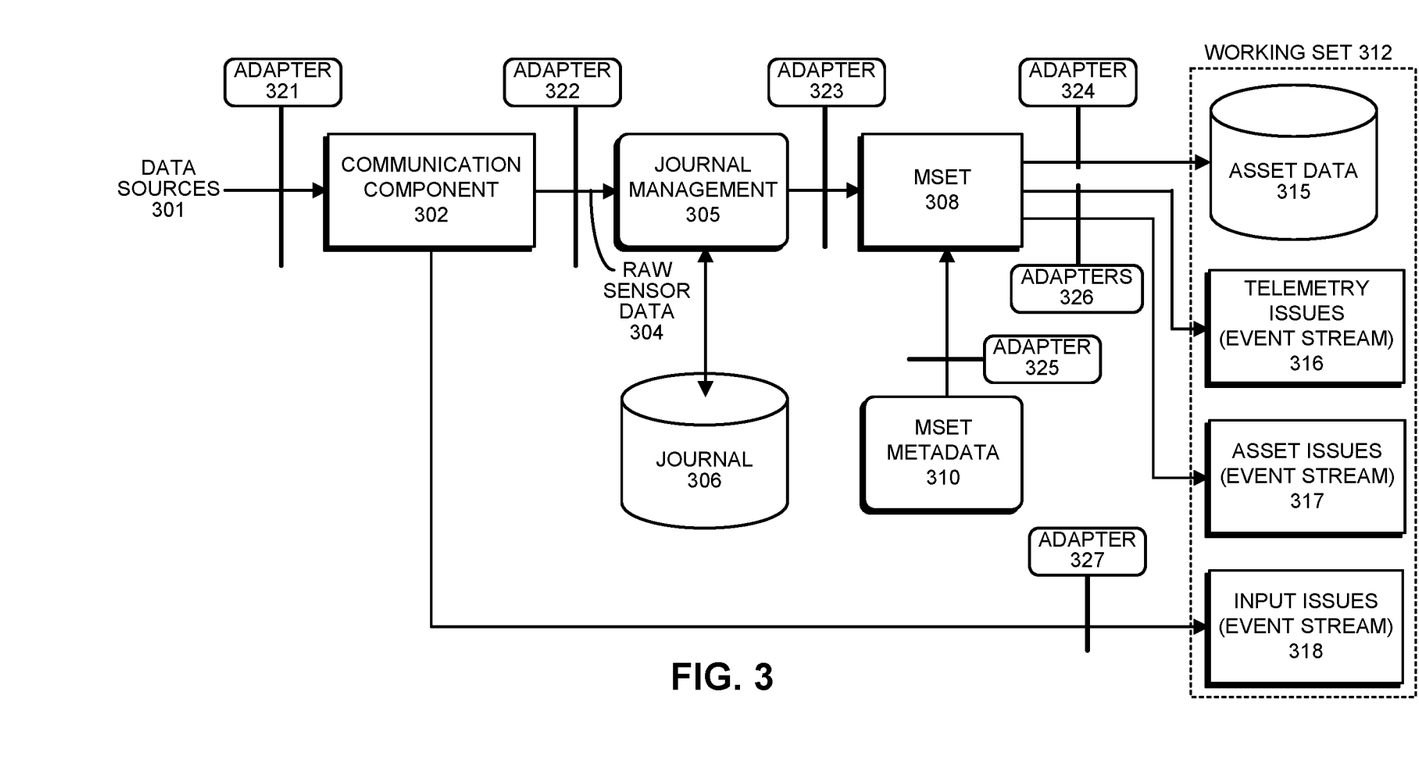
FIG. 3 illustrates an intelligent data preprocessing (IDP) data flow in accordance with the disclosed embodiments.

FIG. 3 illustrates an exemplary IDP data flow in accordance with the disclosed embodiments. During operation, communication component 302 ingests data from various data sources 301 through an adapter 321 and is responsible to verifying the authenticity of the resource; it also supervises the timely arrival of input data. During this process, communication component 302 can accept supervisory information about incoming data, which for example can specify who should send data, or if there exist any scheduling constraints. Communication component 302 can also identify (time) constraint violations, and can verify incoming messages against supervisory constraints, and can also perform required identity management and security checks.

Communication component 302 feeds raw sensor data 304 through an adapter 322 to journal management module 305, which ingests data 304 and delivers it to MSET module 308 through adapter 323. During this process, journal management module 305 transforms and optimizes the data for internal consumption, for example into enterprise parquet format. Journal management module 305 also: inserts data into journal 306; manages accesses to journal 306; and performs various optimizations, such as supporting indices, re-clustering, and information lifecycle management (ILM).

Journal management module 305 also communicates the data to journal 306 and also possibly to external devices for improved reliability. Note that journal 306 can store all incoming data and associated activities. Important characteristics for journal 306 include a high sequential speed for reads and writes, and extreme reliability. This is achievable through a combination of technologies. For example, RAID 5 can be used to improve both speed and reliability with low resource overhead, and to achieve an optimal balance between speed, reliability, and resource consumption. MSET can be used to provide support for tamper-proofing.

Journal 306 includes one or more containers that capture the "ultimate truth" for all data and associated activities. More specifically, journal 306 captures all incoming data and activities, such as sensor readings, training sets, models, and queries, without the intent to interpret any of the data. Journal 306 also facilitates "provenance," by for example maintaining information about who added specific data items and made specific queries at specific times, and by enabling an administrator to replay accesses or activities. Journal 306 also maintains information about: what was been derived by MSET; using which model; based on which data; and at what time. Journal 306 can also supports tamper-proofing by enabling modifications of journal 306 to be detected.

With respect to operational characteristics, journal 306 supports:

high speed inserts and high speed batch-oriented reads. It also supports robustness by facilitating user-defined reliability levels. Journal 306 can be physically organized based on access patterns, for example through adaptive clustering. Journal 306 can use a log-structured merge-tree (LSM) mechanism to cluster the data based on future use and to facilitate immediate access to the data. Note that LSM facilitates customization and can be adapted for optimal clustering and reclustering performance.

As mentioned above, journal management module 305 feeds data through adapter 323, which transforms the data for consumption by MSET module 308. MSET module 308 then prepares the data for storage and follow-on processing. In doing so, MSET module 308 can identify abnormalities in the data, and can also clean and compact the data. While identifying abnormalities in the data, MSET module 308 can: describe deviations from the norm; estimate a remaining useful like (RUL) for an asset; guide root-cause analysis; and recommend actions to remediate a problem. MSET module 308 can also certify provenance for time-series data before processing the time-series data.

Note that an adapter 325 is used to facilitate interactions between MSET module 308 and MSET metadata 310, which is stored in a database. MSET metadata 310 can include: training data sets; derived models; and associations between models and data. More specifically, MSET metadata 310 can comprise a full registry of all models, trainings sets, data structure, and transformations, wherein the transformations are used to communicate between the components. MSET metadata 310 also contains information about associations between models and journal data. For example, for each model, MSET metadata 310 can store information about: (1) a training data set; (2) a mathematical description of an associated derived model; (3) a binary representation of the derived model, which is optimized to the current execution environment; and (4) expressions identifying which data apply to the model. This includes expression identifying: qualifying objects; elements of individual objects; and expressions in the form of an SQL query over the journal data with time traversal criteria. Note an SQL query or a constraint-enforcement mechanism within a database can be used to activate functionality to certify provenance for the original raw data that was used to derive the MSET model.

An adapter 324 is also used to process data that is transferred from MSET module 308 into a working set 312, which comprises an asset data store 315 for storing high-quality cleaned and compacted data, and also event streams 316-318. Note that a given working set, which is stored in working set 312, depends on a corresponding training data asset. Moreover, there can exist multiple working sets within working set store 312, which reflect the evolution and variety of training data sets.

At a high level working set 312 represents interpreted journal data, wherein the interpretation is based on models. It also allows for model evolution, as well as inter-comparison of competing models. This makes the data much more valuable because the data is in a more useable form. Hence, the model effectively acts as a "lens" into the raw data. Moreover, working set 312 provides a significant reduction of the journal data set, which enables users to focus on what is important at a specific moment. Working set 312 also facilitates accesses to any data that was ever present by supporting virtualization with VIEWs on journal 306.

Working set 312 also supports fast accesses to information derived by MSET in real time, where the information can represent: abnormal conditions; sensor problems; asset problems; and missing or unexpected data. Working set 312 also stores data, which is cleaned, improved and compacted using MSET. Note that the journal working set automatically evolves based on access patterns and availability criteria.

Referring back not FIG. 3, note that adapters 326 also exist between MSET module 308 and the event stream to deal with abnormal conditions, such as telemetry issues event stream 316 and asset issues event stream 317. Finally, there is an adapter 327 between communication component 302 and the event stream to deal with input issues event stream 318. Note that Apache Kafka™ can be used to provide simple implementations of the event stream and working set 312. However, a more-sophisticated implementation can be produced based on other database technologies with state of the art support for hierarchies and networks, such as JSON/XML and graphs.

Preprocessing Operations

Figure 4:
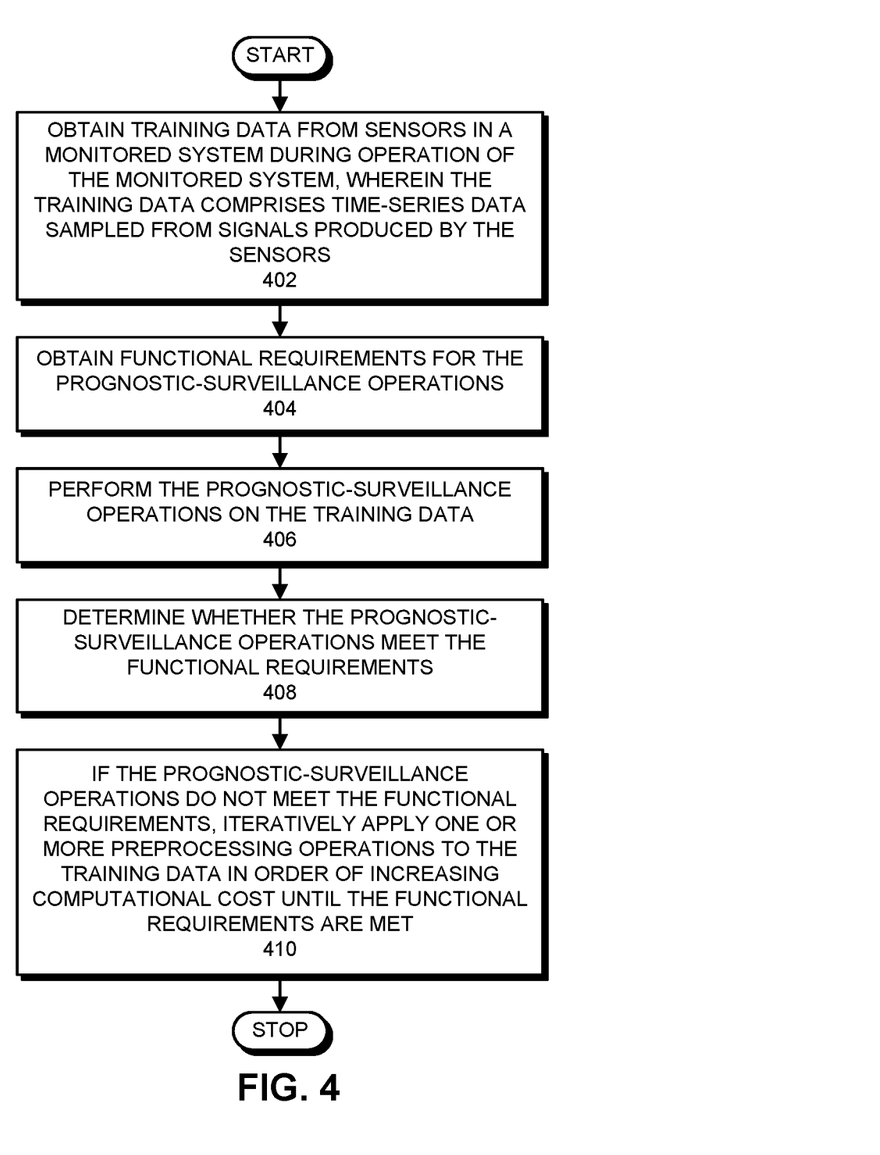
FIG. 4 presents a flow chart illustrating an iterative preprocessing operation in accordance with the disclosed embodiments.

FIG. 4 presents a flow chart illustrating an iterative preprocessing operation in accordance with the disclosed embodiments. During operation, the system obtains training data from sensors in a monitored system during operation of the monitored system, wherein the training data comprises time-series data sampled from signals produced by the sensors (step 402). The system also obtains functional requirements for the prognostic-surveillance operations (step 404). Next, the system performs the prognostic-surveillance operations on the training data (step 406), and determines whether the prognostic-surveillance operations meet the functional requirements (step 408). If the prognostic-surveillance operations do not meet the functional requirements, the system iteratively applies one or more preprocessing operations to the training data in order of increasing computational cost until the functional requirements are met (step 310).

Figure 5:
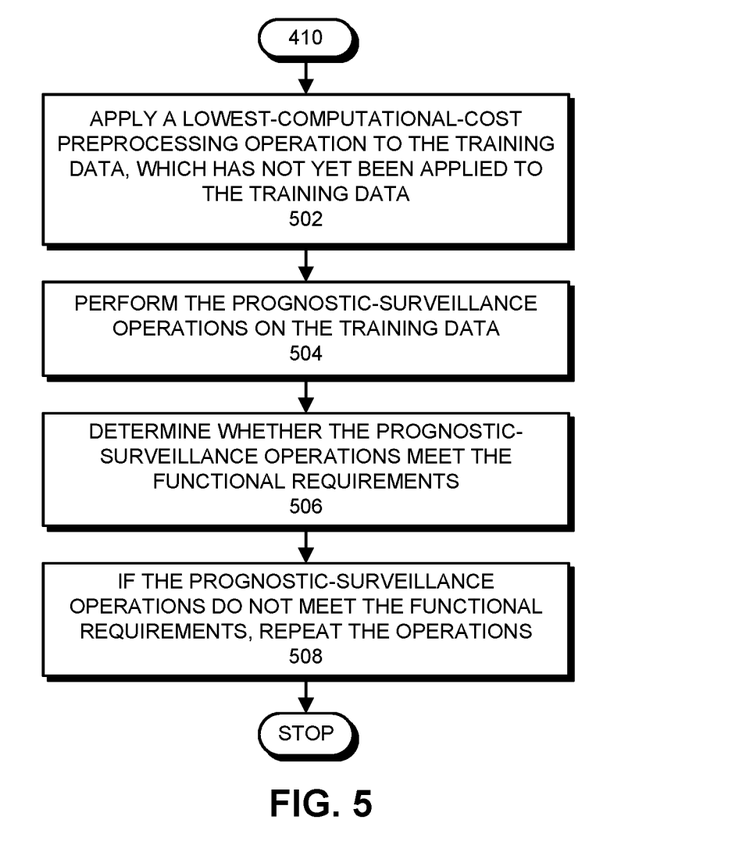
FIG. 5 presents a flow chart illustrating the operations involved in iteratively applying preprocessing operations to the training data in accordance with the disclosed embodiments.

FIG. 5 presents a flow chart illustrating the operations involved in iteratively applying the preprocessing operations to the training data in accordance with the disclosed embodiments. (This flow chart illustrates in more detail the operations involved in step 410 in the flow chart that appears in FIG. 4.) During this iterative process, the system applies a lowest-computational-cost preprocessing operation to the training data, which has not yet been applied to the training data (step 502). (Note that the computational cost can be determined based on an empirically established nonlinear function for each preprocessing operation relating compute cost to a trivariate function of: (1) the number of observations (i.e., sampling rate), (2) the number of signals, and (3) the signal-to-noise ratios for the signals.) Next, the system performs the prognostic-surveillance operations on the training data (step 504), and determines whether the prognostic-surveillance operations meet the functional requirements (step 506). If the prognostic-surveillance operations do not meet the functional requirements, the system repeating the operations (step 508).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for preprocessing sensor data to facilitate prognostic-surveillance operations, comprising:
   obtaining training data from sensors in a monitored system during operation of the monitored system, wherein the training data comprises time-series data sampled from signals produced by the sensors;
   obtaining functional requirements for the prognostic-surveillance operations;
   performing the prognostic-surveillance operations on the training data;
   determining whether the prognostic-surveillance operations meet the functional requirements;
   if the prognostic-surveillance operations do not meet the functional requirements when tested on the training data, iteratively applying one or more preprocessing operations to the training data in order of increasing computational cost until the functional requirements are met;
   training an inferential model for a prognostic pattern-recognition system using the training data;
   preprocessing subsequently received time-series data from the sensors using the same preprocessing operations as were applied to the training data; and
   applying the prognostic pattern-recognition system, which uses the inferential model in a surveillance mode, to the subsequently received time-series data to detect incipient anomalies that arise during subsequent execution of the monitored system.

2. The method of claim 1, wherein the one or more preprocessing operations include one or more of the following:

a faulty sensor detection operation, which detects faulty sensors and replaces or removes data produced by the faulty sensors;

a data dequantization operation, which dequantizes low-resolution time-series data to produce higher-resolution time-series data;

a missing data imputation operation, which replaces missing data values in the time-series data with imputed data values determined based on correlations between the signals;

an analytic-resampling operation that resynchronizes data measurements, which are out of phase because of clock-synchronization disparities in measurement instrumentation for different signals;

a tri-point clustering operation that identifies clusters of highly-correlated signals within clusters, which are poorly correlated between clusters;

an optimal memory vectorization operation, which represents a structure of the time-series data using a minimal set of vectors;

a statistical compression operation, which uses a circular file compression technique to compress older data values; and a remaining-useful life (RUL) estimation operation, which estimates a remaining useful life for one or more components in the monitored system.

3. The method of claim 1, wherein functional requirements for the prognostic-surveillance operations include one or more of the following:
a false-alarm probability (FAP);
a missed-alarm probability (MAP); and
a time-to-detection (TTD) metric for discovering anomalies.

4. The method of claim 1, wherein iteratively applying the one or more preprocessing operations to the training data includes repeating the following operations until the prognostic-surveillance operations meet the functional requirements:
applying a lowest-computational-cost preprocessing operation to the training data, which has not yet been applied to the training data;
performing the prognostic-surveillance operations on the training data;
determining whether the prognostic-surveillance operations meet the functional requirements; and
if the prognostic-surveillance operations do not meet the functional requirements, repeating the operations.

5. The method of claim 1,
wherein the training data and the subsequently received time-series data are stored in a time-series database system; and
wherein the preprocessing operations and the prognostic pattern-recognition operations are performed by functionality, which is incorporated into the time-series database system.

6. The method of claim 1, wherein the inferential model is trained using a Multivariate State Estimation Technique (MSET).

7. The method of claim 1, wherein the functionality is incorporated into the time-series database system through one or more of:
a declarative query;
a data-integrity constraint-enforcement mechanism; and
an MSET model, which is incorporated into a data provenance-tracking mechanism within the time-series database system.

8. The method of claim 1, wherein applying the prognostic pattern-recognition system to detect incipient anomalies comprises detecting impending failures in the monitored system.

9. The method of claim 1, wherein the method further comprises certifying provenance for any received time-series data before processing the received time-series data.

10. A non-transitory computer-readable storage medium storing instructions that when executed by a computer cause the computer to perform a method for preprocessing sensor data to facilitate prognostic-surveillance operations, the method comprising:
obtaining training data from sensors in a monitored system during operation of the monitored system, wherein the training data comprises time-series data sampled from signals produced by the sensors;
obtaining functional requirements for the prognostic-surveillance operations;
performing the prognostic-surveillance operations on the training data;
determining whether the prognostic-surveillance operations meet the functional requirements;
if the prognostic-surveillance operations do not meet the functional requirements when tested on the training data, iteratively applying one or more preprocessing operations to the training data in order of increasing computational cost until the functional requirements are met;
training an inferential model for a prognostic pattern-recognition system using the training data;
preprocessing subsequently received time-series data from the sensors using the same preprocessing operations as were applied to the training data; and
applying the prognostic pattern-recognition system, which uses the inferential model in a surveillance mode, to the subsequently received time-series data to detect incipient anomalies that arise during subsequent execution of the monitored system.

11. The non-transitory computer-readable storage medium of claim 10, wherein the one or more preprocessing operations include one or more of the following:
a faulty sensor detection operation, which detects faulty sensors and replaces or removes data produced by the faulty sensors;
a data dequantization operation, which dequantizes low-resolution time-series data to produce higher-resolution time-series data;
a missing data imputation operation, which replaces missing data values in the time-series data with imputed data values determined based on correlations between the signals;
an analytic-resampling operation that resynchronizes data measurements, which are out of phase because of clock-synchronization disparities in measurement instrumentation for different signals;
a tri-point clustering operation that identifies clusters of highly-correlated signals within clusters, which are poorly correlated between clusters;
an optimal memory vectorization operation, which represents a structure of the time-series data using a minimal set of vectors;
a statistical compression operation, which uses a circular file compression technique to compress older data values; and
a remaining-useful life (RUL) estimation operation, which estimates a remaining useful life for one or more components in the monitored system.

12. The non-transitory computer-readable storage medium of claim 10, wherein functional requirements for the prognostic-surveillance operations include one or more of the following:
- a false-alarm probability (FAP);
- a missed-alarm probability (MAP); and
- a time-to-detection (TTD) metric for discovering anomalies.

13. The non-transitory computer-readable storage medium of claim 10, wherein iteratively applying the one or more preprocessing operations to the training data includes repeating the following operations until the prognostic-surveillance operations meet the functional requirements:
- applying a lowest-computational-cost preprocessing operation to the training data, which has not yet been applied to the training data;
- performing the prognostic-surveillance operations on the training data;
- determining whether the prognostic-surveillance operations meet the functional requirements; and
- if the prognostic-surveillance operations do not meet the functional requirements, repeating the operations.

14. The non-transitory computer-readable storage medium of claim 10,
- wherein the training data and the subsequently received time-series data are stored in a time-series database system; and
- wherein the preprocessing operations and the prognostic pattern-recognition operations are performed by functionality, which is incorporated into the time-series database system.

15. The non-transitory computer-readable storage medium of claim 10, wherein the method further comprises certifying provenance for any received time-series data before processing the received time-series data.

16. A system that performs prognostic-surveillance operations, comprising:
- at least one processor and at least one associated memory; and
- a prognostic-surveillance mechanism that executes on the at least one processor, wherein during operation, the prognostic-surveillance mechanism preprocesses sensor data to facilitate prognostic-surveillance operations by:
  - obtaining training data from sensors in a monitored system during operation of the monitored system, wherein the training data comprises time-series data sampled from signals produced by the sensors,
  - obtaining functional requirements for the prognostic-surveillance operations,
  - performing the prognostic-surveillance operations on the training data,
  - determining whether the prognostic-surveillance operations meet the functional requirements,
  - if the prognostic-surveillance operations do not meet the functional requirements when tested on the training data, iteratively applying one or more preprocessing operations to the training data in order of increasing computational cost until the functional requirements are met,
  - training an inferential model for a prognostic pattern-recognition system using the training data,
  - preprocessing subsequently received time-series data from the sensors using the same preprocessing operations as were applied to the training data, and
  - applying the prognostic pattern-recognition system, which uses the inferential model in a surveillance mode, to the subsequently received time-series data to detect incipient anomalies that arise during subsequent execution of the monitored system.

17. The system of claim 16, wherein the one or more preprocessing operations include one or more of the following:
- a faulty sensor detection operation, which detects faulty sensors and replaces or removes data produced by the faulty sensors;
- a data dequantization operation, which dequantizes low-resolution time-series data to produce higher-resolution time-series data;
- a missing data imputation operation, which replaces missing data values in the time-series data with imputed data values determined based on correlations between the signals;
- an analytic-resampling operation that resynchronizes data measurements, which are out of phase because of clock-synchronization disparities in measurement instrumentation for different signals;
- a tri-point clustering operation that identifies clusters of highly-correlated signals within clusters, which are poorly correlated between clusters;
- an optimal memory vectorization operation, which represents a structure of the time-series data using a minimal set of vectors;
- a statistical compression operation, which uses a circular file compression technique to compress older data values; and
- a remaining-useful life (RUL) estimation operation, which estimates a remaining useful life for one or more components in the monitored system.

18. The system of claim 16, wherein functional requirements for the prognostic-surveillance operations include one or more of the following:
- a false-alarm probability (FAP);
- a missed-alarm probability (MAP); and
- a time-to-detection (TTD) metric for discovering anomalies.

* * * * *